(12) United States Patent
Edwards et al.

(10) Patent No.: US 12,333,539 B2
(45) Date of Patent: Jun. 17, 2025

(54) CARD FOR SECURE INTERACTIONS BY UTILIZING MULTIPLE CARD CREDENTIALS

(71) Applicant: Capital One Services, LLC, McLean, VA (US)

(72) Inventors: Joshua Edwards, Philadelphia, PA (US); Alice Hong, McLean, VA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 266 days.

(21) Appl. No.: 17/660,110

(22) Filed: Apr. 21, 2022

(65) Prior Publication Data

US 2023/0342777 A1    Oct. 26, 2023

(51) Int. Cl.
*G06Q 20/40*    (2012.01)
*G06Q 20/10*    (2012.01)
*G06Q 20/32*    (2012.01)
*G06Q 20/34*    (2012.01)

(52) U.S. Cl.
CPC ..... *G06Q 20/4012* (2013.01); *G06Q 20/1085* (2013.01); *G06Q 20/3278* (2013.01); *G06Q 20/341* (2013.01)

(58) Field of Classification Search
None
See application file for complete search history.

(56) References Cited

U.S. PATENT DOCUMENTS

| | | | |
|---|---|---|---|
| 7,191,952 B2 | 3/2007 | Blossom | |
| 8,676,161 B2 | 3/2014 | Phillips et al. | |
| 10,692,078 B1* | 6/2020 | Kuo | G06Q 20/385 |
| 2016/0217471 A1 | 7/2016 | Ashfield | |
| 2018/0268405 A1 | 9/2018 | Lopez | |
| 2018/0324584 A1 | 11/2018 | Lopez | |
| 2020/0019962 A1* | 1/2020 | Locke | G06Q 20/352 |
| 2022/0207312 A1* | 6/2022 | Wolfe | G06K 19/0723 |

(Continued)

FOREIGN PATENT DOCUMENTS

EP    3654264 A1    5/2020

OTHER PUBLICATIONS

International Search Report and Written Opinion for Application No. PCT/US2023/016588, mailed on Jul. 6, 2023, 10 pages.

*Primary Examiner* — Neha Patel
*Assistant Examiner* — Nicholas K Phan
(74) *Attorney, Agent, or Firm* — Harrity & Harrity, LLP

(57) ABSTRACT

In some implementations, a device may receive, from a terminal, an indication of a first card credential associated with a card that was provided to the terminal to initiate a first interaction, where the card is associated with the multiple card credentials, including the first card credential. The device may determine that the first card credential is valid based on at least one of: the first card credential having not been previously used for another interaction associated with the card, or a first amount of time, from a first time indicated by a first timestamp associated with the first card credential to a reception time of the first card credential, satisfying a validity threshold. The device may transmit, to the terminal, an indication that the card is approved for the first interaction based on the first card credential being determined to be valid.

20 Claims, 8 Drawing Sheets

(56) References Cited

U.S. PATENT DOCUMENTS

| | | | |
|---|---|---|---|
| 2023/0140038 A1* | 5/2023 | Tsai | G07F 7/0886 |
| | | | 705/41 |
| 2023/0281289 A1* | 9/2023 | Noe | G06Q 20/3227 |
| | | | 726/2 |

* cited by examiner

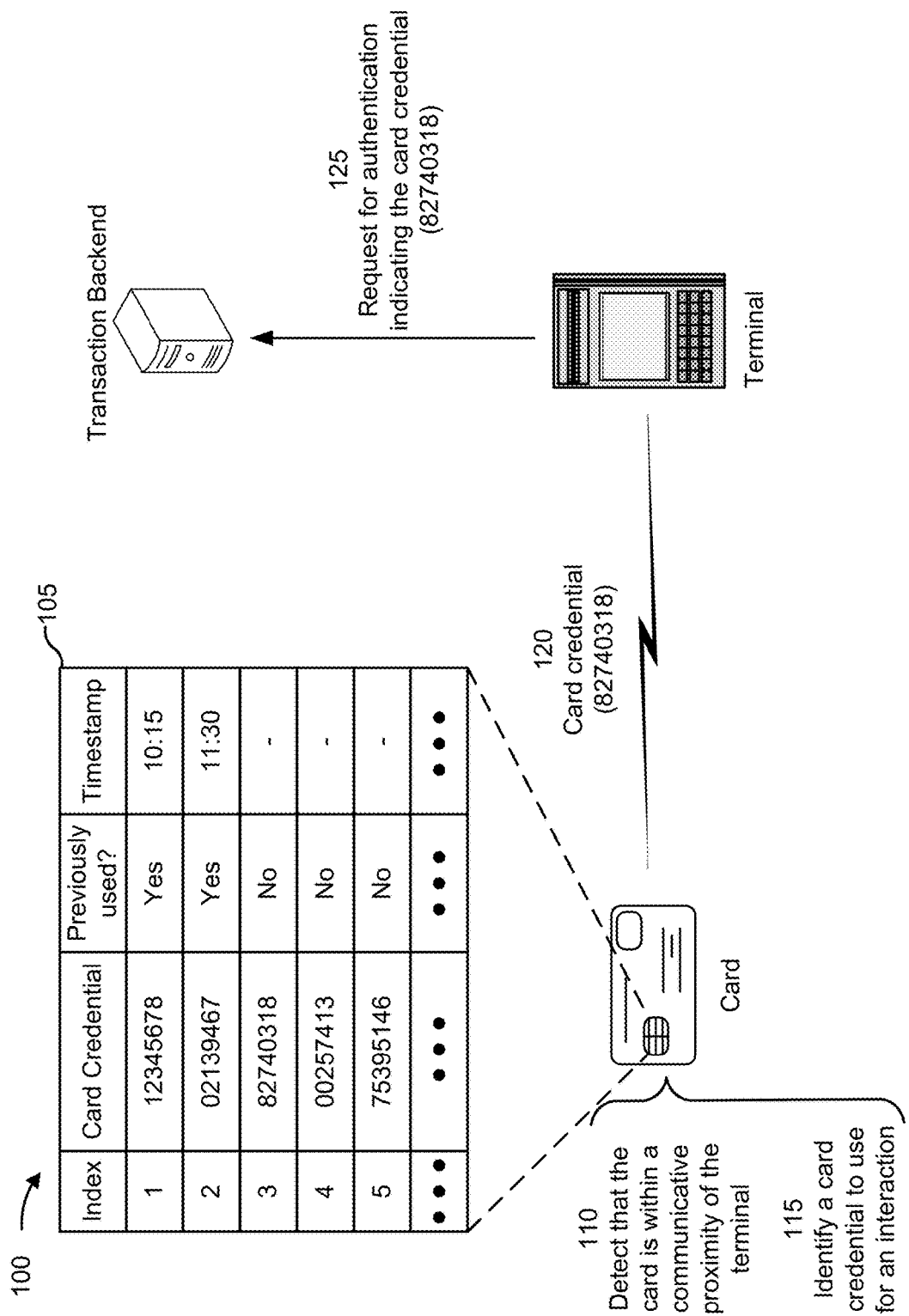

CARD FOR SECURE INTERACTIONS BY UTILIZING MULTIPLE CARD CREDENTIALS

BACKGROUND

Near field communication (NFC) is a set of communication protocols for communication between two electronic devices over a distance, such as 4 centimeters or less. NFC enables a contactless exchange of data over short distances. Two NFC-capable devices are connected via a point-to-point contact over a distance. This connection can be used to exchange data between the devices.

Some communication protocols, such as NFC, may be susceptible to attacks from malicious actors (e.g., attackers). For example, in cryptography and computer security, a man-in-the-middle attack (e.g., a monster-in-the-middle attack, a machine-in-the-middle attack, a monkey-in-the-middle attack, a meddler-in-the-middle (MITM) attack, or a person-in-the-middle (PITM) attack) is a cyberattack where the attacker secretly relays and possibly alters communications between two parties who believe that they are directly communicating with each other, but the attacker has inserted themselves between the two parties. One example of a man-in-the-middle attack is active eavesdropping, in which the attacker makes independent connections with the victims and relays messages between them to make them believe they are talking directly to each other over a private connection, when in fact the entire conversation is controlled by the attacker. A malicious actor may use such schemes to obtain sensitive information from users.

SUMMARY

Some implementations described herein relate to a card for secure interactions with register devices by utilizing multiple card credentials. The card may include an integrated circuit (IC) chip, a near field communication (NFC) component, one or more memories storing the multiple card credentials, and one or more processors coupled to the one or more memories. The one or more processors may be configured to detect, via the NFC component, that the card is within a communicative proximity of a first terminal of a first register device. The one or more processors may be configured to identify, via the IC chip, a first card credential, from the multiple card credentials, to be used for a first interaction with the first register device based on at least one of a timestamp associated with the first card credential that indicates an amount of time for which the first card credential is valid, or an incremental counter maintained by the IC chip that indicates a next card credential, from the multiple card credentials, that is to be used. The one or more processors may be configured to transmit, via the NFC component, the first card credential to enable the first interaction with the first register device to be initiated.

Some implementations described herein relate to a method of performing secure interactions by utilizing multiple card credentials. The method may include receiving, by a device and from a terminal, an indication of a first card credential associated with a card that was provided to the terminal to initiate a first interaction, wherein the card is associated with the multiple card credentials, including the first card credential, and wherein each of the multiple card credentials is associated with a same account of a user associated with the card. The method may include determining, by the device, that the first card credential is valid based on at least one of: the first card credential having not been previously used for another interaction associated with the card, or a first amount of time, from a first time indicated by a first timestamp associated with the first card credential to a reception time of the first card credential, satisfying a validity threshold. The method may include transmitting, by the device and to the terminal, an indication that the card is approved for the first interaction based on the first card credential being determined to be valid.

Some implementations described herein relate to a non-transitory computer-readable medium that stores a set of instructions for a backend device. The set of instructions, when executed by one or more processors of the backend device, may cause the backend device to receive, from an automated teller machine (ATM), an indication of a card credential, from multiple card credentials associated with the card, that was provided to the ATM to initiate an interaction, and wherein each of the multiple card credentials is associated with a same account of a user associated with the card. The set of instructions, when executed by one or more processors of the backend device, may cause the backend device to determine whether to authenticate the card credential based on at least one of: whether the card credential has been previously used for another interaction associated with the card, or whether an amount of time, from a time indicated by a timestamp associated with the card credential to a reception time of the card credential, satisfies a validity threshold. The set of instructions, when executed by one or more processors of the backend device, may cause the backend device to update a database, in which the multiple card credentials are stored, to indicate that the card credential has been received by the backend device. The set of instructions, when executed by one or more processors of the backend device, may cause the backend device to transmit, to the ATM, an indication of whether the card is approved for the interaction based on whether the card credential is authenticated.

BRIEF DESCRIPTION OF THE DRAWINGS

FIGS. 1A-1D are diagrams of an example associated with a card for secure interactions by utilizing multiple card credentials.

DETAILED DESCRIPTION

Figure 1B:
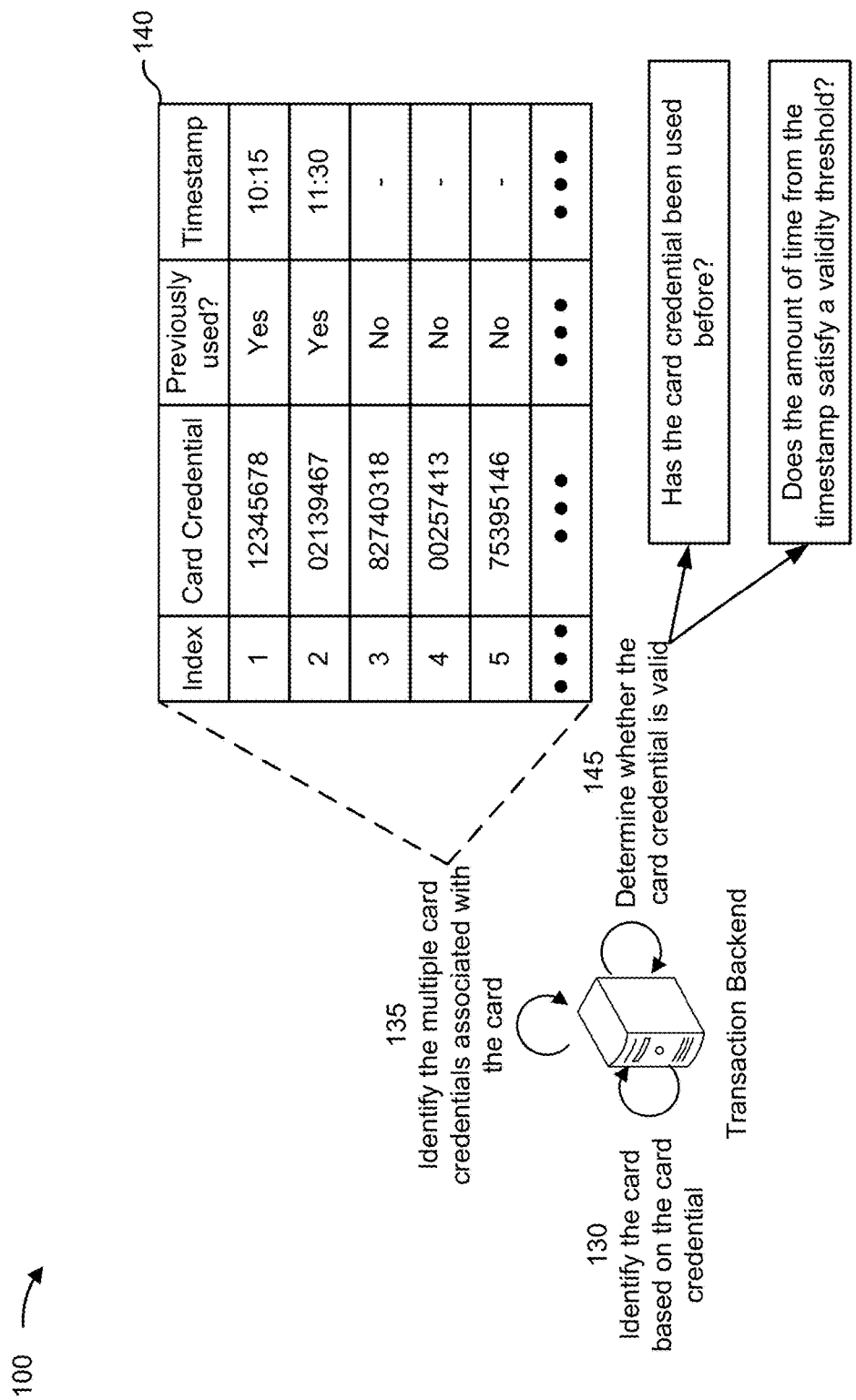

The following detailed description of example implementations refers to the accompanying drawings. The same reference numbers in different drawings may identify the same or similar elements.

In some scenarios, malicious actors may attempt to obtain sensitive information associated with a user by manipulating, or taking advantage of, a communication protocol. For example, a malicious actor may use a device installed at, or located proximate to, a terminal (e.g., a transaction terminal or another terminal) to obtain sensitive information associated with a user by intercepting and/or rerouting communications between a device associated with the user (e.g., a card or a user device) and the terminal.

For example, a user may provide a card (e.g., a transaction card) at a terminal, such as an automated teller machine (ATM) terminal (e.g., an ATM may also be referred to as a register device, a cash machine, a cashpoint, and/or an automated banking machine (ABM), among other examples). The card and the terminal may communicate to exchange data to be used to authenticate the user and/or an account associated with the user. For example, the card may provide (e.g., via a near field communication (NFC) component, a magnetic stripe, and/or another communication component) sensitive information, such as a card credential (e.g., a card number, a primary account number (PAN), a payment card number, and/or another card credential), a unique code (e.g., a security code or a personal identification number (PIN)), and/or other transaction information, to the terminal. The terminal may use the sensitive information to verify and/or authenticate the user and/or an account associated with the user. However, a malicious actor may obtain the sensitive information by using a device installed at, or near, the terminal to intercept the communication(s) between the card and the terminal. The device may receive and store (and/or transmit to another device associated with the malicious actor) the sensitive information. The device may also transmit the sensitive information to the terminal such that the terminal and/or the card (e.g., and/or the user) are unaware that the device has received and/or stored the sensitive information. In other words, the device may eavesdrop on the communication(s) by making independent connections with the card and the terminal and relaying the communication(s) between the card and the terminal to make the card and the terminal (e.g., and the user) believe they are communicating directly to each other over a private connection. The malicious actor may use the sensitive information to access the account associated with the user and/or the card.

Fraudulent schemes, such as an eavesdropping scheme or a man-in-the-middle scheme similar to the scheme described above, may be successful because accounts may be associated with a single credential, to enable a backend system to authenticate and/or verify a card or user using the single credential (e.g., a single card number and/or a single PAN). For example, in order to facilitate the authentication of a card and/or a user, a card may be configured to provide, to a terminal, a single credential to enable a backend system to authenticate the card and/or the user using the single credential associated with the account and/or the card. Using the single credential may reduce complexity associated with authenticating the card and/or the user (e.g., because the backend system and the card do not need to be synchronized on a credential to be used for a given interaction because the single credential is always used), but the use of a single credential for a card or an account also significantly increases the risk that a malicious actor is able to access the account or complete transactions using the single credential. In some scenarios, a temporary credential (e.g., a temporary card number or a virtual card number) may be generated for an account. The temporary credential may be subject to one or more restrictions (e.g., temporal restrictions and/or use restrictions). However, if the temporary credential is obtained by a malicious actor, the malicious actor may still be enabled to use the temporary credential to complete transactions and/or access the account associated with the temporary credential. Moreover, when a temporary credential is associated with an account, a card may be configured to always provide the temporary credential, thereby increasing a risk that a malicious actor is able to obtain the temporary credential (e.g., because the same temporary credential is always provided by the card, subject to any temporal restrictions).

Some techniques and operations described herein enable secure interactions associated with a card by utilizing multiple card credentials. For example, a card and/or an account may be associated with the multiple card credentials (e.g., multiple card numbers or multiple PANs). The card may store the multiple card credentials in one or more memories associated with the card. The card and a backend system may be synchronized regarding which card credential, from the multiple card credentials, is to be used for a given interaction. For example, the card may identify (e.g., via a processor and/or an integrated circuit (IC) chip) a card credential, from the multiple card credentials, to be used for a given interaction based on a time stamp associated with the card credential that indicates an amount of time for which the card credential is valid, or an incremental counter maintained by the IC chip that indicates a next card credential, from the multiple card credentials, that is to be used by the card. In other words, the card may use each card credential for a limited amount of time or may only use each card credential a single time. The backend system may maintain the multiple card credentials associated with the card and may similarly determine a card credential that is to be used by the card. For example, if the backend system receives a given card credential, the backend system may authenticate and/or validate the card credential. Additionally, the backend system may cause the given card credential to be invalidated for future interactions or transactions. In this way, the card and the backend system may be enabled to use multiple card credentials associated with the same card and/or the same account. Additionally, if a malicious actor fraudulently obtains a given card credential, from the multiple card credentials, the malicious actor may be unable to use the given card credential to access the account and/or perform interactions because the given card credential may be invalidated for future interactions or exchanges (e.g., because the backend system may only validate the given card credential for a single use and/or for a limited amount of time).

In some implementations, the card may transmit a card credential, from the multiple card credentials, based on a communication technique used by the card to communicate with a terminal. For example, the card may use one of the multiple card credentials for interactions that are initiated by NFC or another wireless communication protocol (e.g., because wireless communication may be more susceptible to attack and/or interception by a malicious actor). If the card detects that an interaction is initiated via another communication technique, such as via a magnetic stripe or an IC chip, then the card may transmit a static or permanent card credential to the terminal (e.g., because the communication technique may be more secure than a wireless communication technique). This may enable the card to use the multiple card credentials for more interactions or for a longer period of time (e.g., because the multiple card credentials may be single-use or used for a limited amount of time, the card may use all of the multiple card credentials, leaving the card to use only a static or permanent card credential, faster if the multiple card credentials were to be used for all interactions or communication techniques).

In some implementations, a user may indicate a quantity of the multiple card credentials to be associated with the card. In some implementations, the card may communicate, with another device (such as a user device or a terminal), to receive an updated set of card credentials to replace the multiple card credentials in the one or more memories of the card or to be stored in addition to the multiple card credentials in the one or more memories of the card. In this way, the card may receive additional card credentials to be used for secure interactions (e.g., because the card credentials may be single-use or used for a limited amount of time, the card may be required to receive the additional card credentials because an unlimited quantity of card credentials cannot be stored by the card).

FIGS. 1A-1D are diagrams of an example 100 associated with a card for secure interactions by utilizing multiple card credentials. As shown in FIGS. 1A-1D, example 100 includes a card, a terminal, a transaction backend, and a user device. These devices are described in more detail in connection with FIGS. 2 and 3. In some implementations, the card may be a transaction card, an ATM card (e.g., a card that is configured to perform interactions with an ATM, but not perform interactions to cause a transaction to be completed), and/or a multi-function card, among other examples. The terminal may be associated with an ATM and/or may be a point-of-sale terminal. The transaction backend may be associated with an institution that issued the card. For example, the card may be associated with an account provided by, maintained by, and/or otherwise associated with the institution.

As shown in FIG. 1A, the card may be configured to store multiple card credentials associated with the card and/or an account. The multiple card credentials may be multiple card numbers, multiple card identifiers, multiple payment card numbers, and/or multiple PANs, among other examples. The multiple card credentials may be unique identifiers of the card and/or the account associated with the card. In some implementations, the card may be configured to store the multiple card credentials and a permanent or static card credential.

The multiple card credentials may be used by the card in certain scenarios (e.g., when communicating via a certain communication technique, such as NFC) and the permanent or static card credential may be used by the card in other scenarios (e.g., when communicating via other communication techniques and/or when the card no longer has any valid card credentials from the multiple card credentials). For example, to extend an amount of time, or a quantity of interactions, for which the multiple card credentials may be used by the card to improve security associated with interactions, the card may be configured to only use the multiple card credentials in scenarios associated with an increased security risk, such as in connection with NFC or other wireless communications. As used herein, an "interaction" may refer to an interaction between the card and a terminal. For example, an interaction may occur when the card communicates, or attempts to communicate, with the terminal. An interaction may be associated with an exchange, a transaction, and/or a session to access an account via an ATM or other device, among other examples.

As shown by reference number 105, the card may store the multiple card credentials. In some implementations, the card may store the multiple card credentials in a database or an array. For example, in some implementations, the card may store the multiple card credentials in an ordered array (e.g., an array in which the multiple card credentials are associated with a particular order) or an ordered list. The ordered array or the ordered list may indicate an order in which the multiple card credentials are to be used for interactions associated with the card (e.g., may indicate an order in which the card is to use the multiple card credentials).

In some implementations, the transaction backend and/or another device may assign the multiple card credentials to the card. For example, the transaction backend and/or the other device may generate the multiple card credentials for the card (e.g., to ensure that the multiple card credentials are unique). In some implementations, the transaction backend and/or the other device may generate the multiple card credentials based on receiving a request from the user associated with the account (e.g., via the user device or another device associated with the user). For example, the user may request that the card be associated with multiple card credentials. In some implementations, the request may indicate a quantity of card credentials to be stored on the card (e.g., 10 card credentials, 20 card credentials, 50 card credentials, or another quantity of card credentials). For example, a quantity of the multiple card credentials (e.g., stored by the card at a given time) may be based on the request from the user associated with the card.

The multiple card credentials may be stored on the card as part of a manufacturing process of the card. For example, the multiple card credentials may be pre-loaded on the card (e.g., stored in a memory of the card) prior to the card being provided or issued to the user. As another example, the multiple card credentials may be stored on the card based at least in part on the card communicating with a device (e.g., in a similar manner as described and depicted in more detail in connection with FIG. 1D).

In some implementations, the transaction backend and the card may both use a single card credential, from the multiple card credentials, for a single interaction. In other words, the transaction backend and the card may treat each card credential, of the multiple card credentials, as a single-use credential. Alternatively, the transaction backend may only use a single card credential, from the multiple card credentials, for a single interaction (e.g., a single use only for each card credential) and the card may use the single card credential for interactions, including the single interaction, for a threshold amount of time. Alternatively, the transaction backend and the card may both use a single card credential for interactions for the threshold amount of time. Using a single card credential for the threshold amount of time may enable the stored card credentials to be used for a longer period of time and/or for an increased quantity of interactions. Additionally, using a single card credential for the threshold amount of time may enable the card to not waste a card credential that was transmitted by the card, but not received by the terminal (e.g., a mis-read or a failed communication). For example, where the transaction backend only uses a single card credential, from the multiple card credentials, for a single interaction and the card uses the single card credential for interactions, including the single interaction, for the threshold amount of time, the card may be enabled to transmit the single card credential multiple times (e.g., within the threshold amount of time from a first transmission of the single card credential) to account for scenarios in which the single card credential is not successfully received by the terminal. However, if the single card credential is successfully received by the terminal and successfully transmitted to the transaction backend by the terminal, then the transaction backend may only verify or authenticate the single card credential for a single interaction, thereby increasing the security of the card and/or the account.

For example, as shown in FIG. 1A, the card may store information associated with the multiple card credentials. For example, the card may store an index value or an identifier associated with each card credential. The card may store and/or maintain a counter (e.g., an incremental counter) that indicates or points to an index value of a card credential to be used by the card. In some implementations, the card may store an indication of whether a card credential has been previously used by the card (e.g., an indication of whether the card credential has been previously transmitted by the card). Additionally, or alternatively, the card may store a timestamp associated with each card credential. The timestamp may indicate a time at which the card first transmitted an indication of the card credential. Additionally, or alternatively, the timestamp may indicate a remaining amount of time for which the card credential is valid. In some implementations, the card may store a timestamp, for a card credential, only while the card credential is valid. In other words, when an amount of time for which the card credential is valid expires, the card may remove or delete the timestamp associated with the card credential. In this way, the card may be enabled to identify a valid card credential based at least in part on whether a timestamp associated with the card credential is stored.

As shown by reference number 110, the card may detect that the card is within a communicative proximity of the terminal. "Communicative proximity" may refer to a distance that enables the card to communicate with the terminal. For example, the card may detect, via an NFC component, a Bluetooth component, or a radio frequency (RF) component, that the card is within the communicative proximity of the terminal. The terminal may be associated with an ATM (e.g., a register device, a cashpoint, or an ABM) and/or a point-of-sale device. For example, the card may detect, based on communicating with the terminal via NFC or another wireless communication protocol, that the card is within the communicative proximity of the terminal. In some implementations, the card may detect the communication technique (e.g., the communication protocol) that will be used to communicate with the terminal (e.g., NFC, Bluetooth, a magnetic stripe, and/or an IC chip).

As shown by reference number 115, the card may identify a card credential to use for an interaction with the terminal. For example, the card may identify, via a processor and/or an IC chip, the first card credential, from the multiple card credentials, to be used for a first interaction with the terminal (e.g., with the device associated with the terminal). In some implementations, the card may determine whether one of the multiple card credentials or a permanent card credential is to be used for the interaction with the terminal. For example, the card may determine whether one of the multiple card credentials or a permanent card credential is to be used for the interaction with the terminal based on a communication technique or a communication protocol used to communicate with the terminal. For example, if the card is using NFC to communicate with the terminal, then the card may determine to use one of the multiple card credentials for the interaction. If the card is using another communication technique (e.g., a magnetic stripe or an IC chip) to communicate with the terminal, then the card may determine to use the permanent card credential. For example, the card may detect, via the IC chip, that the card is interacting with an IC chip reader or a magnetic stripe reader for initiating the interaction with the terminal. As a result, the card may identify and/or transmit (e.g., via the IC chip or a magnetic stripe of the card) the permanent card credential associated with the card based on the interaction being associated with the IC chip reader or the magnetic stripe reader of the terminal.

In some implementations, the card may identify the first card credential based on a time stamp associated with the first card credential that indicates an amount of time for which the first card credential is valid. Additionally, or alternatively, the card may identify the first card credential based on an incremental counter (e.g., maintained by the IC chip of the card) that indicates a next card credential, from the multiple card credentials, that is to be used. For example, in some implementations, each card credential of the multiple card credentials is used by the card for a single interaction and the incremental counter may point to (e.g., may indicate) the next card credential, from the multiple card credentials, that is to be used by the card. For example, as shown in FIG. 1A, the card may store an indication of whether a card credential has been used (e.g., has been transmitted to a terminal or another device) by the card. If a card credential has been previously used by the card, then the card may refrain from using (e.g., may refrain from transmitting an indication of) the card credential for another interaction with a terminal.

In some implementations, the incremental counter may indicate an index value associated with the first card credential (e.g., the card credential to be used for the interaction). For example, each time the card detects an interaction (e.g., each time the card transmits an indication of a card credential, of the multiple card credentials), the incremental counter may be iterated to indicate a next index value and/or a next card credential to be used by the card. In this way, the card may ensure that card credentials are not transmitted multiple times (e.g., because the card credential that was previously used will result in a denied interaction by the transaction backend) and may also ensure that the card transmits an indication of a card credential that is expected by the transaction backend (e.g., to enable the card and the transaction backend to be synchronized and to accurately and efficiently authenticate the card and/or the user).

In some implementations, the multiple card credentials may be stored in an ordered list and/or an ordered array. In such examples, the card may identify the first card credential based on a next card credential, according to the ordered list or the ordered array, after a last used card credential. For example, as shown in FIG. 1A, the last used card credential, according to the ordered list, is the card credential "02139467." Therefore, the card may identify that the card credential to be used for the interaction with the terminal is the card credential "82740318" according to the ordered list. As another example, an incremental counter maintained by the card may indicate the card credential "82740318" and/or the index value "3," thereby enabling the card to identify that the card credential "82740318" is to be used for the interaction.

In some other implementations, each card credential, of the multiple card credentials, is used for a threshold amount of time from a time indicated by a timestamp associated with the card credential. The threshold amount of time may be 30 seconds, 1 minute, 3 minutes, 5 minutes, 10 minutes, or another amount of time. The card may determine whether a card credential is still valid based on a timestamp, associated with a card credential, and the threshold amount of time. For example, the card may determine whether an amount of time between a time when the card detects that the card is within the communicative proximity of the terminal and a time indicated by the timestamp satisfies the threshold amount of time (e.g., is less than or equal to the threshold amount of time). If the difference satisfies the threshold amount of time, then the card may use the card credential. If the difference does not satisfy the threshold amount of time, then the card may use another card credential (e.g., may refrain from using or transmitting an indication of the card credential).

The card may identify the other card credential in a similar manner as described above (e.g., using an incremental counter or an ordered list).

In some implementations, when an amount of time from a time indicated by a timestamp no longer satisfies the threshold amount of time (e.g., when the amount of time from the time indicated by the timestamp is greater than the threshold amount of time) the card may remove or delete the timestamp. Therefore, in such examples, to identify the card credential to use for the interaction, the card may identify whether any card credentials are associated with a stored timestamp. If the card identifies a card credential associated with a stored timestamp, then the card may use the card credential for the interaction. If the card does not identify any card credentials that are associated with a stored timestamp, then the card may identify another card credential in a similar manner as described above (e.g., using an incremental counter or an ordered list).

In some implementations, the card may identify to use a permanent card credential for the interaction based on determining that no card credentials, of the multiple card credentials, are available for use by the card. For example, the card may identify that all of the card credentials have been previously used by the card and/or that no card credentials are valid based on timestamp(s) associated with the multiple card credentials. As a result, the card may determine that the permanent card credential is to be used for the interaction. The permanent card credential may be a card credential that is used for other communication techniques, such as a magnetic stripe, and/or a card credential that is associated with the card for the life of the card.

As shown by reference number 120, the card may transmit, and the terminal may receive, an indication of the first card credential (e.g., the card credential identified by the card, such as the card credential "82740318"). The card may transmit the indication of the first card credential via NFC, Bluetooth, or another wireless communication protocol. In some other implementations, the card may transmit the indication of the first card credential via a magnetic stripe of the card or the IC chip of the card. In some implementations, the card may generate and/or store a timestamp associated with the first card credential based on transmitting the first card credential. For example, if the card credential was not previously associated with a timestamp, then the card may generate and/or store the timestamp associated with the first card credential. The timestamp may indicate that time at which the first card credential was transmitted by the card. Additionally, or alternatively, the card may store an indication that the first card credential was used by the card based on transmitting the first card credential. This may enable the card to identify that the first card credential was previously used (e.g., to enable the card to refrain from using the card credential for future interactions).

As an example, at a future time (e.g., from the time when the card transmits the first card credential), the card may detect, via the NFC component, that the card is within a communicative proximity of a second terminal (or the terminal at the future time). The card may identify a second card credential, from the multiple card credentials, to be used for a second interaction in a similar manner as described above. For example, the card may identify the second card credential based on the timestamp associated with the first card credential or another timestamp associated with the second card credential, and/or the incremental counter maintained by the IC chip (and/or the ordered list or ordered array). The first card credential and the second card credential may be different card credentials. In some implementations, the first card credential and the second card credential may be the same card credential (e.g., if the time between the future time and the timestamp associated with the first card credential satisfies the threshold amount of time). The card may transmit, and the second terminal (or the terminal) may receive, an indication of the second card credential.

As shown by reference number 125, the terminal may transmit, and the transaction backend may receive, a request for authentication of the card and/or the user. The request for authentication may indicate the first card credential (e.g., the card credential "82740318"). Additionally, the request for authentication may indicate additional transaction information, such as a location of the interaction, a time of the interaction, a date of the interaction, and/or other information, to enable the transaction backend to determine whether to approve the request for authentication (e.g., to authenticate the card). For example, the transaction backend may receive an indication of the first card credential associated with the card that was provided to the terminal to initiate the first interaction.

As shown in FIG. 1B, the transaction backend may determine whether to authenticate the card based on the first card credential indicated by the terminal. For example, as shown by reference number 130, the transaction backend may identify the card based on the card credential indicated by the terminal. For example, the transaction backend may maintain and/or store sets of card credentials for multiple cards. Therefore, the transaction backend may identify the card based on the card credential indicated by the terminal (e.g., and/or the transaction information indicated by the terminal). For example, the transaction backend may identify the card based on the card credential being included in a set of card credentials maintained and/or stored by the transaction backend.

As shown by reference number 135, the transaction backend may identify the multiple card credentials associated with the card. For example, as shown by reference number 140, the transaction backend may store information associated with the multiple card credentials (e.g., in a similar manner as described above). For example, the transaction backend may store an indication of whether a card credential has been previously received by the transaction backend. Additionally, or alternatively, the transaction backend may store a timestamp associated with one or more of the card credentials (e.g., indicating a time at which an indication of the card credential was received by the transaction backend).

As shown by reference number 145, the transaction backend may determine whether the first card credential (e.g., indicated by the terminal) is valid. For example, the transaction backend may determine whether the card credential is valid based on the first card credential having not been previously used for another interaction associated with the card, and/or a first amount of time, from a first time indicated by a first timestamp associated with the first card credential to a reception time of the first card credential, satisfying a validity threshold (e.g., the threshold amount of time). For example, the transaction backend may identify the card based on the first card credential, an identifier associated with the card, and/or an indication from the terminal. The transaction backend may determine whether the first card credential is valid based on card credentials, of the multiple card credentials, that have been previously received by the device. Additionally, or alternatively, the transaction backend may determine whether the first card credential is valid based on an amount of time from a first reception of the first card credential to receiving the indication of the first card credential.

In other words, in some examples, if the transaction backend determines that the first card credential (e.g., indicated by the terminal) has previously been received by the transaction backend, then the transaction backend may determine that the first card credential is not valid. Alternatively, if the transaction backend determines that the first card credential (e.g., indicated by the terminal) has not previously been received by the transaction backend and that the first card credential is included in the multiple card credentials associated with the card (e.g., shown by reference number 140), then the transaction backend may determine that the first card credential is valid. This may improve the security associated with the account of the card because the transaction backend may not validate or authenticate card credentials that have been previously received by the transaction backend. Therefore, if a malicious actor obtains one of the card credentials, from the multiple card credentials, by intercepting a communication from the card to the terminal (or from the terminal to the transaction backend), the card credential may not be used by the malicious actor to access the account and/or perform interactions because the transaction backend would have already received that card credential. Therefore, the security of the account may be improved.

In some implementations, if the transaction backend determines that the first card credential (e.g., indicated by the terminal) has previously been received by the transaction backend, then the transaction backend may determine whether the amount of time from the time indicated by a timestamp and a time at which the first card credential is received satisfies the validity threshold (e.g., the threshold amount of time). If the amount of time satisfies the validity threshold, then the transaction backend may determine that the first card credential is valid. If the amount of time does not satisfy the validity threshold, then the transaction backend may determine that the first card credential is not valid. In some implementations, the transaction backend may not utilize a timestamp associated with card credentials and may only validate a given card credential a single time. In other words, the transaction backend may treat each card credential, of the multiple card credentials, as single-use card credentials. This may improve the security associated with the account because a malicious actor may be unable to use a card credential that was previously provided to the transaction backend.

As described elsewhere herein, the multiple card credentials may be stored (e.g., by the transaction backend) in an ordered list or an ordered array. In some implementations, there may be one or more card credentials, that have not been used for interactions by the card and the device, in the ordered list between the first card credential (e.g., indicated by the terminal) and a card credential that was most recently received before the first card credential. For example, the card credential that was most recently received before the first card credential may be the card credential "02139467" and the first card credential may be the card credential "75395146" associated with the index number 5. In such examples, the transaction backend may determine that the one or more card credentials are invalid based on receiving the first card credential. For example, the transaction backend may determine that the card credential "82740318" and the card credential "00257413" are invalid based on receiving the card credential "75395146." The transaction backend may invalidate the one or more card credentials because receiving the card credential "75395146" may indicate that the card attempted to transmit the card credential "82740318" and the card credential "00257413" (e.g., based on the ordered list or the ordered array), but that the transaction backend did not successfully receive the card credential "82740318" and the card credential "00257413." This may improve a security associated with the account because the transaction backend may ensure that card credentials that are skipped in the ordered list or the ordered array are invalidated, thereby reducing, or eliminating, a risk that a malicious actor is able to obtain and use the card credentials that are skipped in the ordered list or the ordered array.

The transaction backend may determine whether other card credentials, indicated by the card and/or the terminal, for future interactions associated with the card are valid in a similar manner as described above. For example, the transaction backend may receive an indication of a second card credential associated with the card to initiate a second interaction. The transaction backend may determine whether the second card credential is valid in a similar manner as described above.

Figure 1C:
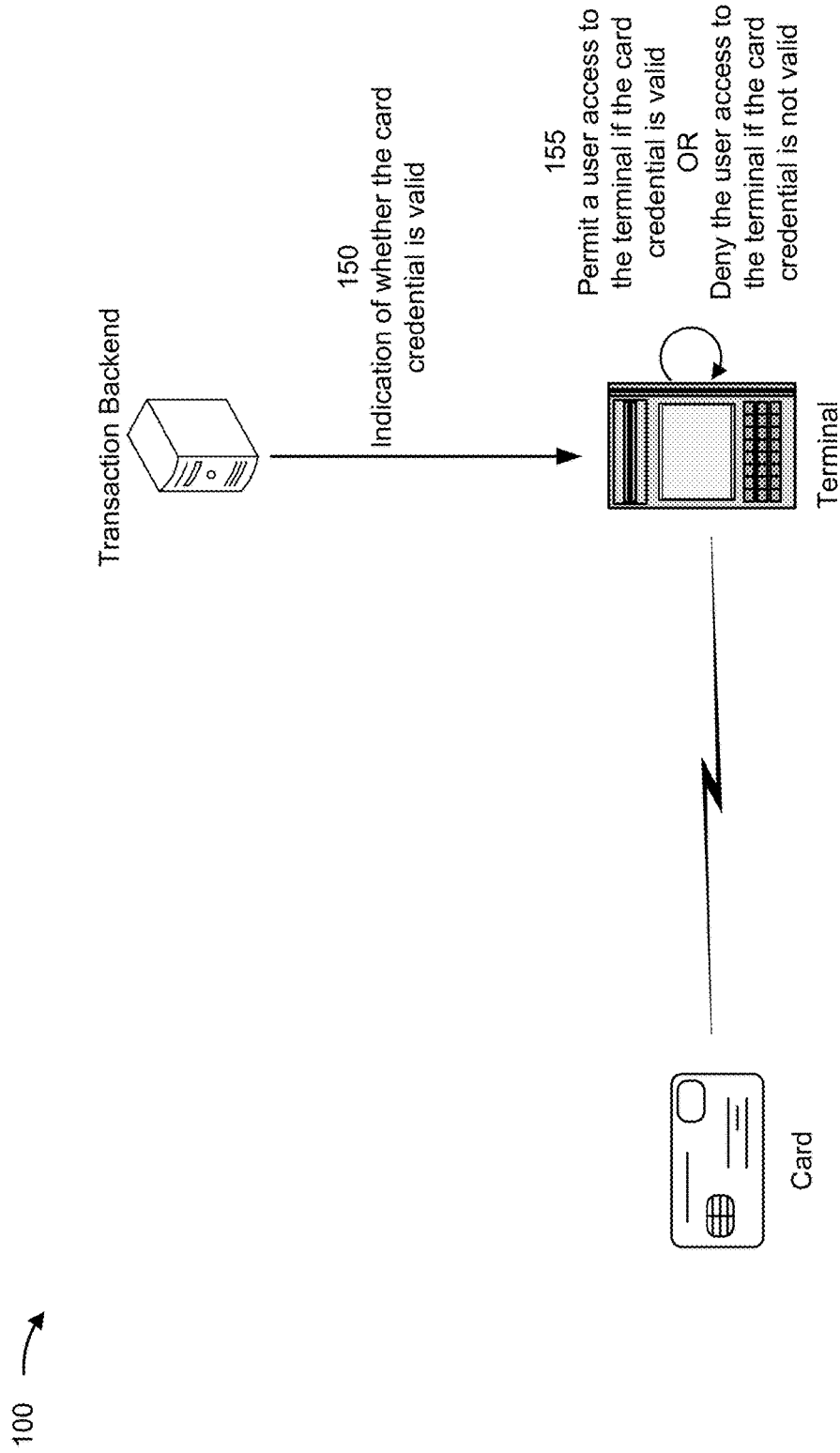

As shown in FIG. 1C, and by reference number 150, the transaction backend may transmit, and the terminal may receive, an indication of whether the first card credential is valid. For example, the transaction backend may transmit, to the terminal, an indication that the card is approved for the interaction based on the first card credential being determined to be valid by the transaction backend. The transaction backend may transmit, to the terminal, an indication that the card is denied or rejected for the interaction based on the first card credential being determined to be invalid by the transaction backend.

As shown by reference number 155, the terminal may permit a user access to the terminal if the card credential is valid (e.g., as indicated by the transaction backend). Alternatively, the terminal may deny the user access to the terminal if the card credential is not valid (e.g., as indicated by the transaction backend). For example, the terminal may be associated with an ATM. If the transaction backend indicates that the card credential (e.g., indicated by the card) is valid, then the terminal may enable the user to access one or more functions of the ATM. Alternatively, if the transaction backend indicates that the card credential (e.g., indicated by the card) is invalid, then the terminal may deny the user to access the one or more functions of the ATM.

In some implementations, the terminal may be associated with a point-of-sale device. In such examples, if the transaction backend indicates that the card credential (e.g., indicated by the card) is valid, then the terminal may enable a transaction to be completed and/or may provide an indication that the transaction is approved. Alternatively, if transaction backend indicates that the card credential (e.g., indicated by the card) is invalid, then the terminal may deny the transaction and/or may provide an indication that the transaction is denied.

Figure 1D:
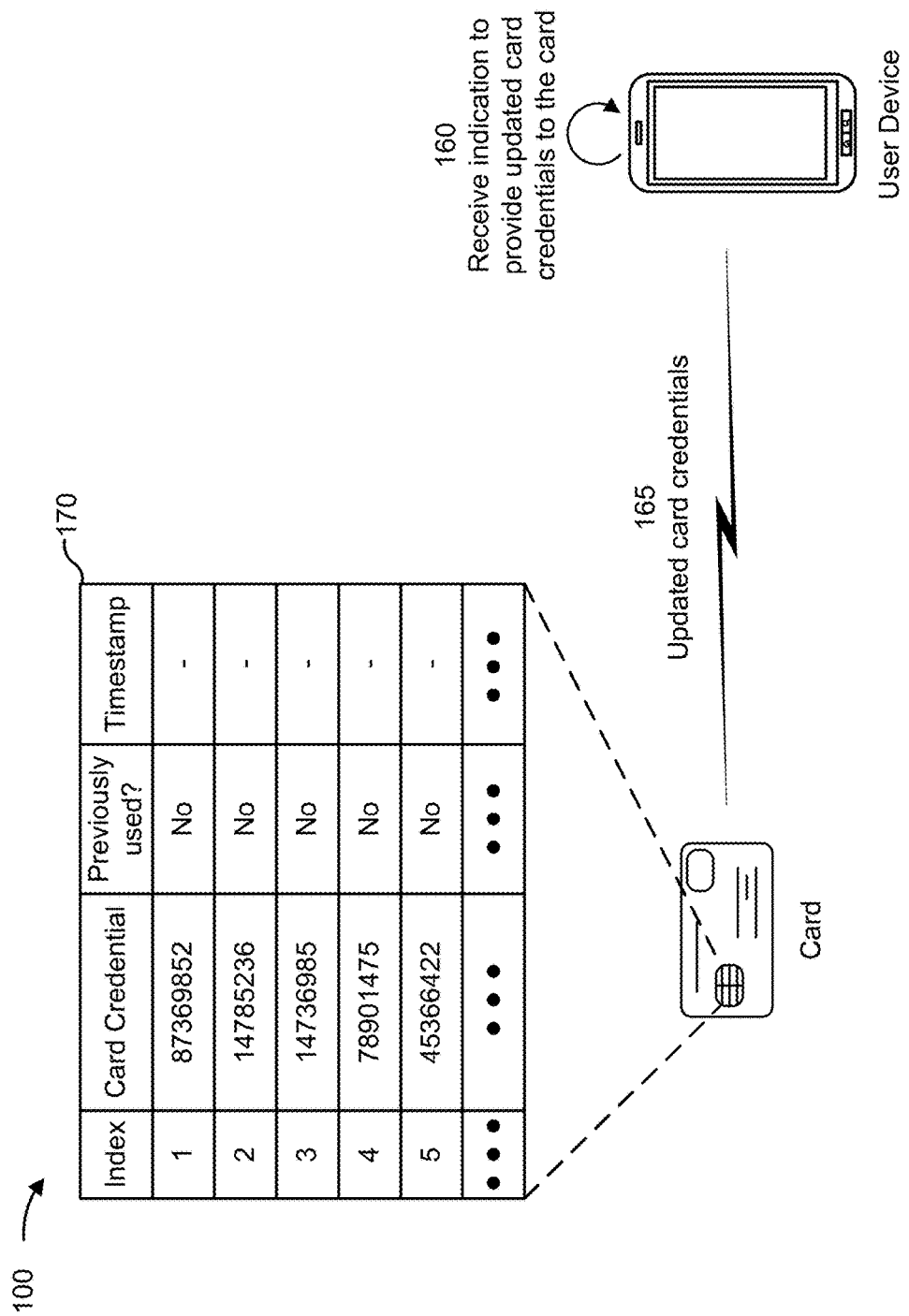

As shown in FIG. 1D, the card may receive additional card credentials to be stored by the card. For example, as shown by reference number 160, the user device may receive an indication to provide updated card credentials to the card. For example, the user device may transmit, to the transaction backend or another device, a request for updated card credentials. For example, the user may identify that the card has no more remaining valid card credentials stored and/or that a quantity of valid card credentials stored by the card is low (e.g., valid card credentials being card credentials that can still be used by the card to perform interactions, as described above). The user may interact with the user device to request additional or updated card credentials for the card. The transaction backend, or another device, may generate the additional or updated card credentials for the card (e.g., to ensure that the additional or updated card credentials are unique). The user device may receive, from the transaction backend or the other device, the indication of the additional or updated card credentials for the card.

As shown by reference number 165, the user device may transmit, and the card may receive, an indication of the updated or additional card credentials. In some implementations, the card may receive the indication of the updated or the additional card credentials from another device, such as a device associated with the institution that issued the card. As another example, the card may receive the indication of the updated or the additional card credentials from a terminal, such as the terminal described elsewhere herein.

As shown by reference number 170, the card may store the updated or the additional card credentials. In some implementations, as shown in FIG. 1D, the updated or the additional card credentials may replace any card credentials that were previously stored by the card. For example, based on receiving the indication of the updated or the additional card credentials, the card may remove or delete any card credentials stored by the card and may store the updated or the additional card credentials. This may decrease a complexity associated with ensuring that the card and the transaction backend are synchronized regarding the card credentials that are associated with the card. As another example, the updated or the additional card credentials may be stored in addition to any card credentials that were previously stored by the card. In some implementations, the card may remove or delate any card credentials, stored by the card, that are no longer valid (e.g., thereby conserving memory resources associated with the card) and the updated or the additional card credentials may be stored in addition to any card credentials that were previously stored by the card that are still valid. In other words, the updated set of card credentials may replace the multiple card credentials in the one or more memories of the card or may be stored in addition to the multiple card credentials in the one or more memories of the card. In this way, the card may receive additional card credentials to ensure that the card can still be used to perform interactions (e.g., to reduce a likelihood of a scenario in which the card is no longer associated with a valid card credential and is required to use the permanent card credential, which may be less secure).

As indicated above, FIGS. 1A-1D are provided as an example. Other examples may differ from what is described with regard to FIGS. 1A-1D.

Figure 2:
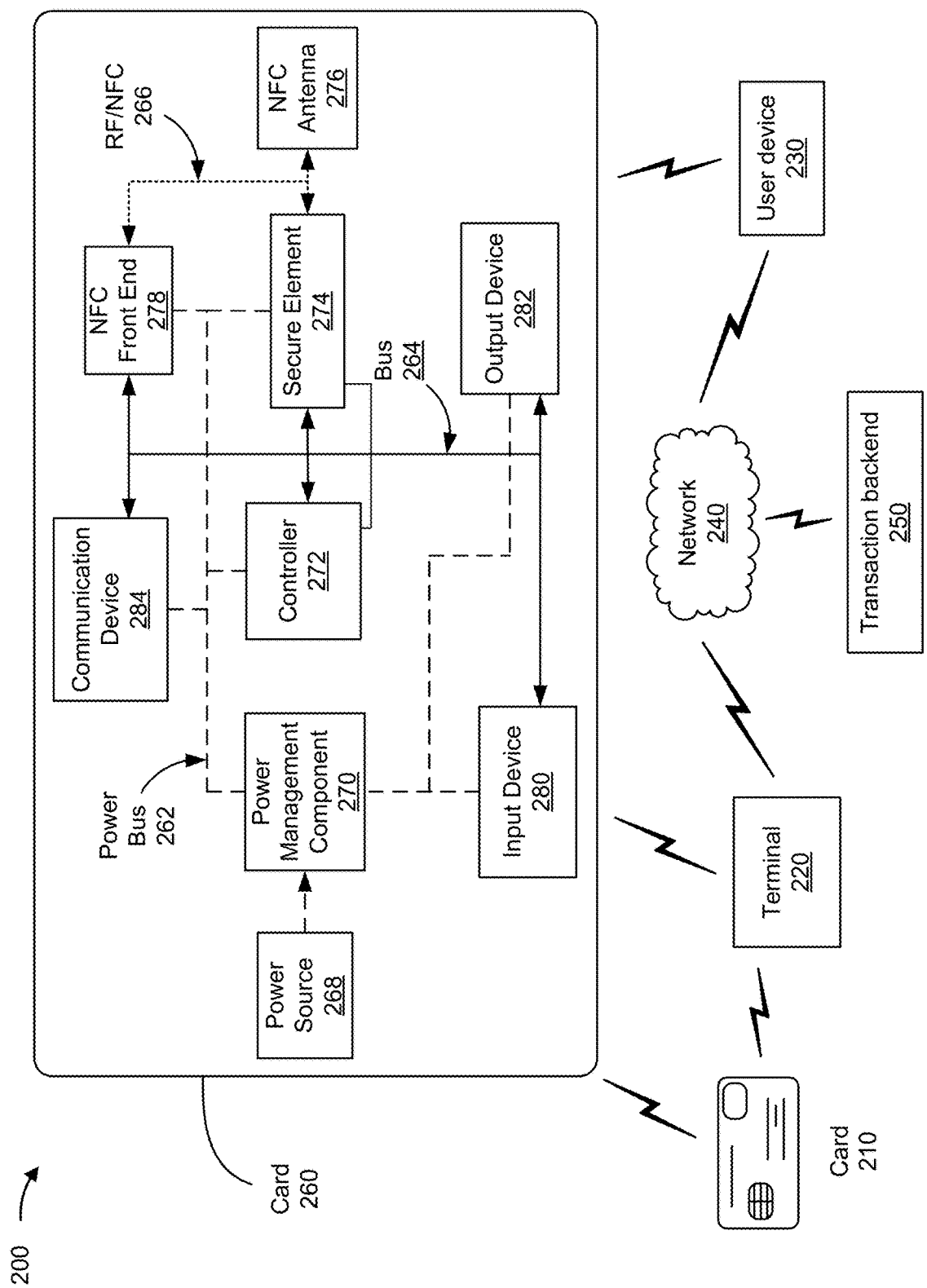
FIG. 2 is a diagram of an example environment in which systems and/or methods described herein may be implemented.

FIG. 2 is a diagram of an example environment 200 in which systems, devices, and/or methods, described herein, may be implemented. As shown in FIG. 2, environment 200 may include a card 210, a terminal 220, a user device 230, a network 240, a transaction backend 250, and a card 260. Devices of environment 200 may interconnect via wired connections, wireless connections, or a combination of wired and wireless connections.

Card 210 includes a transaction card capable of storing and/or communicating data for a point-of-sale (PoS) transaction with the terminal 220 and/or the card 260. For example, the card 210 may store or communicate data including account information (e.g., an account identifier, a cardholder identifier, etc.), expiration information of the card 210, banking information, and/or transaction information (e.g., a payment token), among other examples. For example, to store or communicate the data, the card 210 may include a magnetic stripe and/or an IC chip (e.g., a EUROPAY®, MASTERCARD®, and VISA® (EMV) chip). In some implementations, the card 210 may include an antenna to communicate data associated with the card 210, and/or may be capable of communicating wirelessly (e.g., via Bluetooth, Bluetooth Low Energy (BLE), and/or NFC) with another device, such as the terminal 220, the card 260, and/or a digital wallet, among other examples. In some implementations, the card 210 may communicate with the terminal 220 and/or the card 260 to complete a transaction (e.g., based on being within communicative proximity of the terminal 220 and/or the card 260).

The terminal 220 includes one or more devices to facilitate processing a transaction via the card 210 and/or the card 260. The terminal 220 may include a PoS terminal, a security access terminal, and/or an ATM terminal, among other examples. The terminal 220 may include one or more input devices and/or output devices to facilitate obtaining transaction card data from the card 210 and/or the card 260, and/or interaction or authorization from a cardholder of the card 210 and/or the card 260. Example input devices of the terminal 220 may include a number keypad, a touchscreen, a magnetic stripe reader, a chip reader, an NFC component, and/or an RF signal reader, among other examples. Example output devices of the terminal 220 may include a display device, a speaker, and/or a printer, among other examples.

User device 230 includes one or more devices capable of receiving, generating, storing, processing, and/or providing information associated with the card 210 and/or the card 260. For example, the user device 230 may include a communication device and/or a computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, the user device 230 may include application logic capable of facilitating communications between the terminal 220 and the card 260.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction backend 250 includes one or more devices associated with a bank and/or a transaction card association that authorizes transactions and/or facilitates a transfer of funds or payments between an account of a cardholder of the card 210 and/or the card 260 and an account of an individual or business of the terminal 220. For example, transaction backend 250 may include one or more devices of one or more issuing banks associated with a cardholder of the card 210 and/or the card 260, one or more devices of one or more acquiring banks (or merchant banks) associated with the terminal 220, and/or one or more devices associated with one or more card associations (e.g., VISA®, MASTERCARD®, and/or the like) associated with the card 210 and/or the card 260. Accordingly, in response to receiving transaction card data associated with the card 210 and/or the card 260 from the terminal 220, various banking institutions and/or card associations of transaction backend 250 may communicate to authorize the transaction and/or transfer funds between the accounts associated with the card 210, the card 260, and/or the terminal 220.

The card 260 includes a transaction card capable of storing and/or communicating data for a PoS transaction with the terminal 220, and capable of receiving and/or storing data for a PoS transaction with the card 210. In some implementations, the card 260 may be referred to as a multi-function transaction card. For example, the card 260 may store or communicate data including account information (e.g., an account identifier, a cardholder identifier, etc.), expiration information of the card 260, banking information, and/or transaction information (e.g., a payment token), among other examples. For example, to store or communicate the data, the card 260 may include a magnetic stripe and/or an IC chip (e.g., an EMV chip).

In some implementations, the card 260 may include a card body in or on which various components are embedded. In some implementations, the card 260 may include an antenna to communicate data associated with the terminal 220 and/or the card 210 and/or may be capable of communicating wirelessly (e.g., via Bluetooth, BLE, NFC, and/or another wireless communication protocol) with another device, such as the terminal 220, the card 210, the user device 230, and/or a digital wallet, among other examples. In some implementations, the card 260 may communicate with the terminal 220, the card 210, and/or the user device 230, among other examples, to complete a transaction (e.g., based on being moved within communicative proximity of the terminal 220, the card 210, and/or the user device 230). In some implementations, the card 260 may include one or more components and/or one or more functionalities of the terminal 220 and/or one or more components and/or functionalities of the card 210.

Power bus 262 includes a component that permits the delivery of power to various components of the card 260. Bus 264 includes a component that permits communication among various components of the card 260. RF/NFC 266 may include a communication link that permits data delivery between secure element 274, NFC antenna 276, and NFC front end 278.

Power source 268 includes one or more devices, internal to the card 260, capable of supplying power. For example, power source 268 may include a battery (e.g., a rechargeable battery or a non-rechargeable battery), a power supply, and/or a capacitor (e.g., a supercapacitor and/or an ultracapacitor), among other examples. In some implementations, the card 260 (e.g., controller 272, secure element 274, and/or NFC front end 278) may obtain power from power source 268 when the card 260 is to perform a transaction. In some implementations, the card 260 may include a single power source 268, which may supply power for performing a transaction and/or may supply power to one or more other components of the card 260 (e.g., a processor, a storage component, an input component, an output component, a communication interface, and/or another component). In some implementations, the card 260 may include multiple power sources 268. In some implementations, a single power source 268 may be dedicated to supplying power solely for performing a transaction, while other power sources 268 may supply power to other components of the card 260. In some implementations, the card 260 may include one or more solar cells and associated circuitry that enable various components of the card 260 to be powered by solar energy.

Power management component 270 includes one or more devices capable of controlling the delivery of power to various components of the card 260 and/or controlling charging of power source 268. For example, power management component 270 may include a switch, a gate, a controller, a regulator, a processing component, a bidirectional logic level shifter, and/or a diode, among other examples. In some implementations, power management component 270 may control signals between controller 272 and secure element 274 (e.g., to couple or decouple controller 272 and secure element 274, to prevent signals from being passed between controller 272 and secure element 274).

Controller 272 includes one or more devices capable of receiving, generating, storing, processing, and/or providing information and/or instructions that assist with performing a transaction. For example, controller 272 may include a processor, a memory, and/or the like, as described elsewhere herein. In some implementations, controller 272 may be directly, communicatively coupled to secure element 274 (e.g., via a dedicated, single-wire communication link).

Secure element 274 includes one or more devices capable of securely hosting an operating system and/or an application, and/or storing confidential information (e.g., a credential, cryptographic information). For example, secure element 274 may include a universal integrated circuit card (UICC), a secure digital (SD) card (e.g., a microSD card), and/or an embedded secure element, among other examples. In some implementations, secure element 274 may include a tamper resistant hardware platform. In some implementations, secure element 274 may include one or more processors (e.g., one or more microcontrollers) certified by a standard body group, such as an EMV Consortium (EMVCo) certified (e.g., 16-bit or another size) secure microcontroller. In some implementations, secure element 274 may host a personalized card application and a cryptographic key required to perform a financial transaction (e.g., with the terminal 220). In some implementations, secure element 274 may store multiple credentials associated with the card 260 and/or another transaction card, such as a card number, a username, a password, biometric information, a token, and/or a certificate for signing documents, among other examples.

In some implementations, secure element 274 may include application logic configured to communicate with NFC front end 278 (e.g., to cause NFC front end 278 to provide card data from secure element 274 to the terminal 220 to submit a payment, and/or to cause NFC front end 278 to receive card data from another transaction card (e.g., the card 210) to process a payment). In some implementations, secure element 274 may include application logic configured to communicate with controller 272 (e.g., to cause controller 272 to communicate with a user device (e.g., the user device 230) to facilitate online data authentication relating to a transaction (e.g., with the card 210), and/or to receive instructions from controller 272 to initiate transaction processing (e.g., associated with the card 210), among other examples). In some implementations, secure element 274 may include application logic configured to receive inputs from input device 280 (e.g., directly or via controller 272), and/or to provide outputs to output device 282 (e.g., directly or via controller 272), among other examples.

NFC antenna 276 includes an antenna capable of transmitting and/or receiving information using an NFC protocol. For example, NFC antenna 276 may include a loop antenna (e.g., an NFC loop antenna), and/or an inductor (e.g., an NFC inductor), among other examples. In some implementations, NFC antenna 276 may be integrated into, or with, secure element 274 and/or NFC front end 278 (e.g., may be part of the same integrated circuit, such as a transaction IC).

NFC front end 278 includes one or more devices capable of communicating with external devices, such as the card 210 and/or the terminal 220, using an NFC protocol. NFC front end 278 may include one or more radio modules for receiving and/or emitting NFC signals. NFC front end 278 may include one or more processors (e.g., microprocessor(s), microcontroller(s), and/or the like) and/or be coupled to one or more processors, such as controller 272, processor(s) included in secure element 274, and/or the like.

Although not shown, in some implementations, the card 260 may include a transaction IC that includes an integrated circuit connecting secure element 274, NFC antenna 276, and/or one or more other components of the 260. For example, the transaction IC may include secure element 274, NFC antenna 276, NFC front end 278, connection(s) between secure element 274, NFC antenna 276, and/or NFC front end 278, among other examples.

Input device 280 includes one or more components that permit the card 260 to receive information, such as via user input (e.g., to initiate a transaction, such as to receive card data from the card 210). For example, input device 280 may include an input component described elsewhere herein. Output device 282 includes one or more components that permit the card 260 to provide output information (e.g., relating to transaction processing associated with the card 210 and/or the terminal 220). For example, output device 282 may include an output component described elsewhere herein. Communication device 284 includes a transceiver-like component that enables the card 260 to communicate with other devices. For example, communication device 284 may include a communication component described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
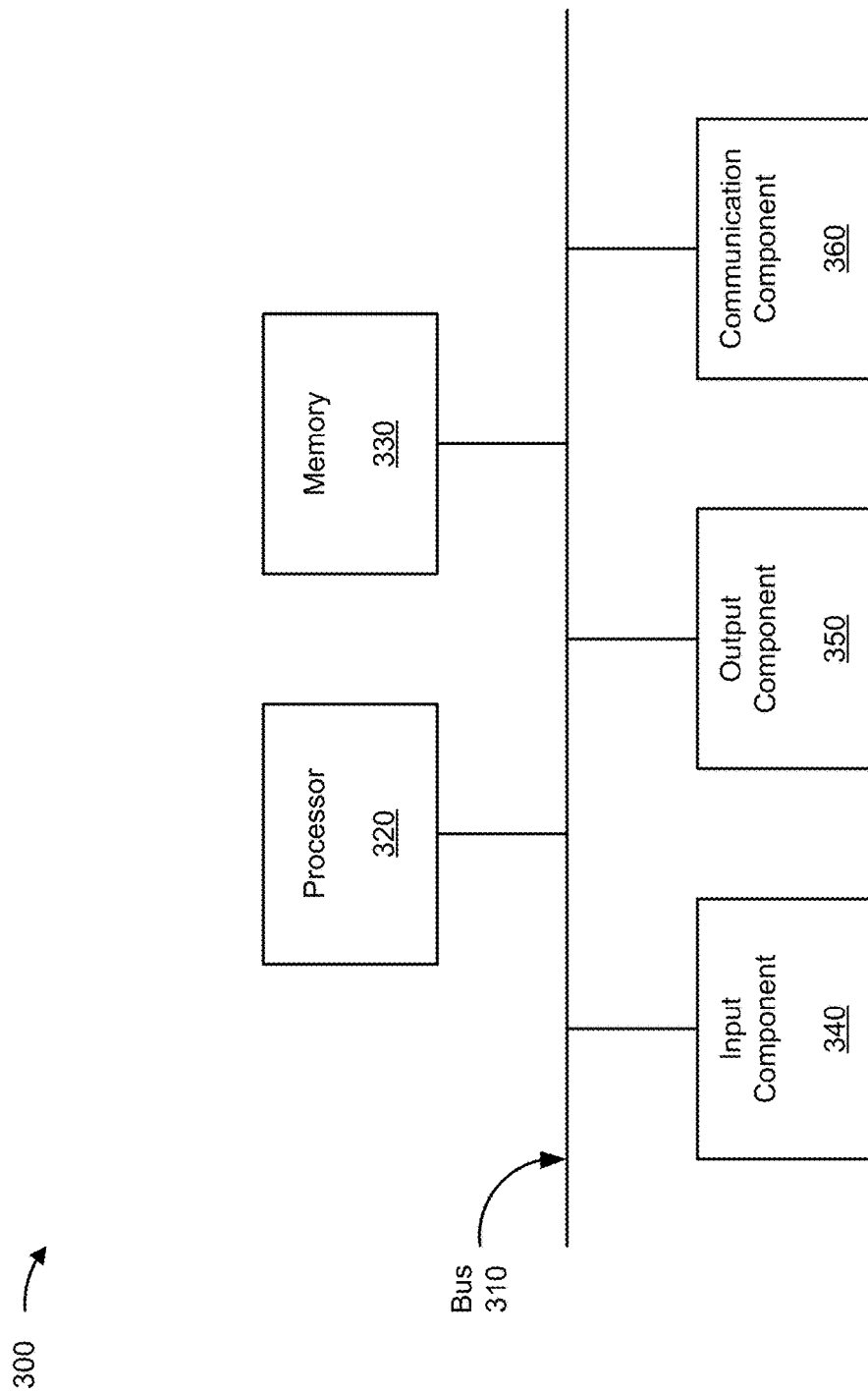
FIG. 3 is a diagram of example components of one or more devices of FIG. 2.

FIG. 3 is a diagram of example components of a device 300, which may correspond to the card 210, the card 260, the terminal 220, the user device 230, and/or the transaction backend 250. In some implementations, the card 210, the card 260, the terminal 220, the user device 230, and/or the transaction backend 250 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
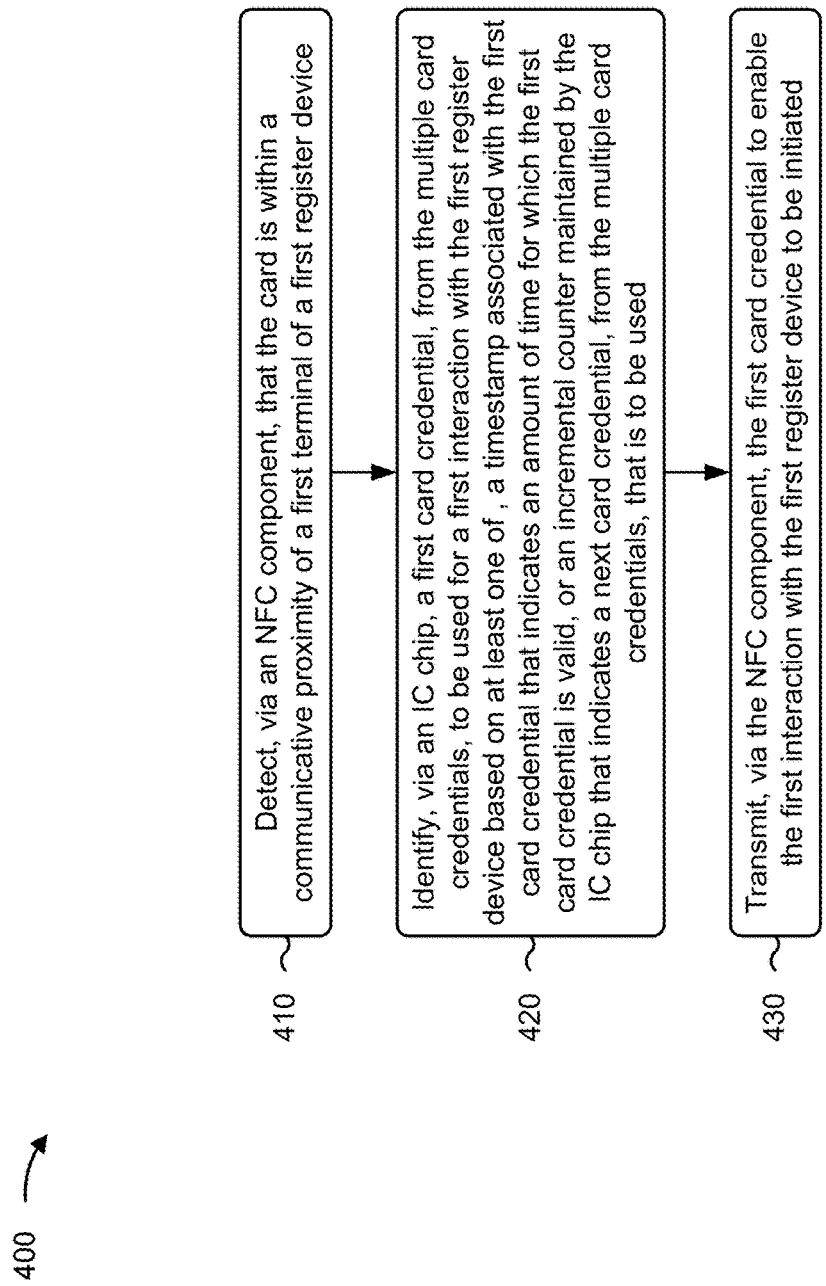
FIGS. 4 and 5 are flowcharts of example processes relating to a card for secure interactions by utilizing multiple card credentials.

FIG. 4 is a flowchart of an example process 400 associated with a card for secure interactions by utilizing multiple card credentials. In some implementations, one or more process blocks of FIG. 4 may be performed by a card (e.g., the card 210 or the card 260). In some implementations, one or more process blocks of FIG. 4 may be performed by another device or a group of devices separate from or including the card, such as the terminal 220, the user device 230, and/or the transaction backend 250. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include detecting, via an NFC component, that the card is within a communicative proximity of a first terminal of a first register device (block 410). As further shown in FIG. 4, process 400 may include identifying, via an IC chip, a first card credential, from the multiple card credentials, to be used for a first interaction with the first register device based on at least one of: a timestamp associated with the first card credential that indicates an amount of time for which the first card credential is valid, or an incremental counter maintained by the IC chip that indicates a next card credential, from the multiple card credentials, that is to be used (block 420). As further shown in FIG. 4, process 400 may include transmitting, via the NFC component, the first card credential to enable the first interaction with the first register device to be initiated (block 430).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D.

Figure 5:
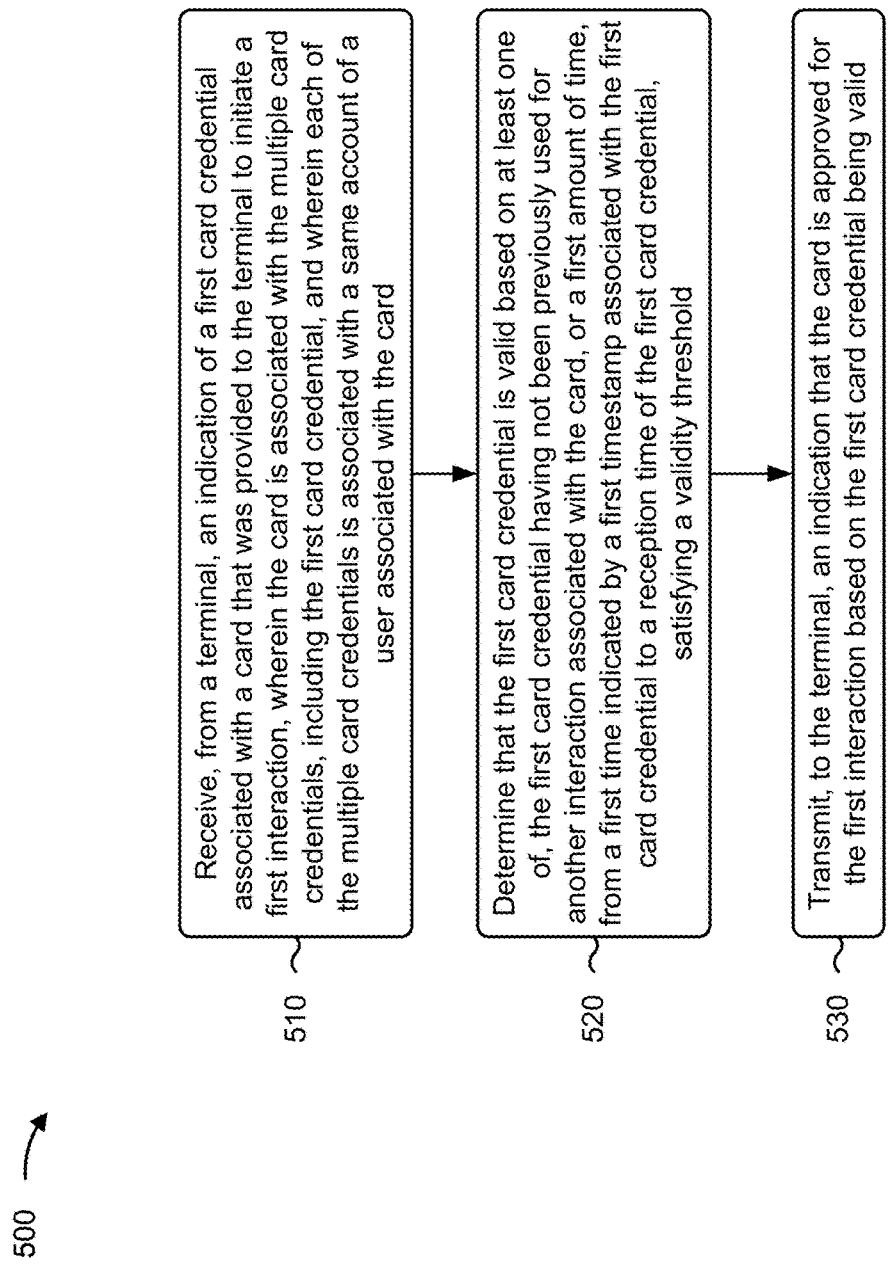

FIG. 5 is a flowchart of an example process 500 associated with card for secure interactions by utilizing multiple card credentials. In some implementations, one or more process blocks of FIG. 5 may be performed by a transaction backend (e.g., transaction backend 250). In some implementations, one or more process blocks of FIG. 5 may be performed by another device or a group of devices separate from or including the transaction backend, such as the card 210, the card 260, the terminal 220, and/or the user device 230. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving, from a terminal, an indication of a first card credential associated with a card that was provided to the terminal to initiate a first interaction (block 510). In some implementations, the card is associated with the multiple card credentials including the first card credential. In some implementations, each of the multiple card credentials is associated with a same account of a user associated with the card. As further shown in FIG. 5, process 500 may include determining that the first card credential is valid based on at least one of: the first card credential having not been previously used for another interaction associated with the card, or a first amount of time, from a first time indicated by a first timestamp associated with the first card credential to a reception time of the first card credential, satisfying a validity threshold (block 520). As further shown in FIG. 5, process 500 may include transmitting, to the terminal, an indication that the card is approved for the first interaction based on the first card credential being determined to be valid (block 530).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A card for secure interactions with register devices by utilizing multiple card credentials, the card comprising:
an integrated circuit (IC) chip;
a near field communication (NFC) component;
one or more memories storing a permanent card credential and the multiple card credentials, wherein each of the multiple card credentials is associated with a same account of a user associated with the card,
wherein the multiple card credentials include a primary account number; and
one or more processors, coupled to the one or more memories, configured to:
use the multiple card credentials or the permanent card credential based on determining whether an NFC technique or another communication technique is being used to communicate with a first terminal of a first register device,
wherein the one or more processors, to use the multiple card credentials or the permanent card credential, are configured to:
detect, via the NFC component, that the card is within a communicative proximity of the first terminal; and
determine, based on detecting via the NFC component that the card is within the communicative proximity of the first terminal, to use the multiple card credentials;
identify, via the IC chip and based on determining to use the multiple card credentials, a first card credential, from the multiple card credentials, to be used for a first interaction with the first register device based on at least one of:
a timestamp associated with the first card credential that indicates an amount of time for which the first card credential is valid, or
an incremental counter maintained by the IC chip that indicates a next card credential, from the multiple card credentials, that is to be used; and
transmit, via the NFC component, the first card credential to enable the first interaction with the first register device to be initiated.

2. The card of claim 1, wherein the one or more processors are further configured to:
detect, via the NFC component, that the card is within a communicative proximity of a second terminal of a second register device;
identify, via the IC chip, a second card credential, from the multiple card credentials, to be used for a second interaction with the second register device based on at least one of:
the timestamp associated with the first card credential or another timestamp associated with the second card credential, or
the incremental counter maintained by the IC chip; and
transmit, via the NFC component, the second card credential to enable the second interaction with the second register device to be initiated.

3. The card of claim 1, wherein the one or more processors, to identify the first card credential, are configured to:
identify whether any card credentials, from the multiple card credentials, are associated with a valid timestamp; and
determine to use the first card credential based on the first card credential being associated with the valid timestamp or based on no card credentials, from the multiple card credentials, being associated with the valid timestamp.

4. The card of claim 1, wherein the one or more processors, to identify the first card credential, are configured to:
determine to use the first card credential based on the incremental counter indicating an index value associated with the first card credential.

5. The card of claim 1, wherein each card credential of the multiple card credentials is used by the card for a single interaction or only for a threshold amount of time from a time indicated by a timestamp associated with the card credential.

6. The card of claim 1, wherein the one or more processors are further configured to:
communicate, via the NFC component and with a device, to receive an updated set of card credentials; and
store the updated set of card credentials in the one or more memories,
wherein the updated set of card credentials replace the multiple card credentials in the one or more memories or are stored in addition to the multiple card credentials in the one or more memories.

7. The card of claim 1, wherein the multiple card credentials are stored in the one or more memories in an ordered array, and wherein the one or more processors, to identify the first card credential, are configured to:
identify to use the first card credential based on the first card credential being a next card credential, indicated by the incremental counter, in the ordered array.

8. The card of claim 1, wherein the one or more processors are further configured to:
detect, via the IC chip, that the card is interacting with an IC chip reader or a magnetic stripe reader for initiating a second interaction with a second terminal; and
transmit, via the IC chip or a magnetic stripe of the card, the permanent card credential associated with the card based on the second interaction being associated with the IC chip reader or the magnetic stripe reader.

9. A method for secure interactions with register devices by utilizing multiple card credentials, comprising:
using, by a card, multiple card credentials or a permanent card credential based on identifying whether a near field communication (NFC) technique or another communication technique is being used to communicate with a first terminal of a first register device,
wherein the multiple card credentials include a primary account number, and
wherein using the multiple card credentials or the permanent card credential comprises:
detecting, via an NFC component of the card, that the card is within a communicative proximity of the first terminal; and
determining, based on detecting via the NFC component that the card is within the communicative proximity of the first terminal, to use the multiple card credentials;
identifying, by the card and via an integrated circuit (IC) chip of the card and based on determining to use the multiple card credentials, a first card credential, from the multiple card credentials, to be used for a first interaction with the first register device based on at least one of:

a timestamp associated with the first card credential that indicates an amount of time for which the first card credential is valid, or an incremental counter maintained by the IC chip that indicates a next card credential, from the multiple card credentials, that is to be used; and transmitting, via the NFC component, the first card credential to enable the first interaction with the first register device to be initiated.

10. The method of claim 9, further comprising:

detecting, via the NFC component, that the card is within a communicative proximity of a second terminal of a second register device;

identifying, via the IC chip, a second card credential, from the multiple card credentials, to be used for a second interaction with the second register device based on at least one of:

the timestamp associated with the first card credential or another timestamp associated with the second card credential, or the incremental counter maintained by the IC chip; and transmitting, via the NFC component, the second card credential to enable the second interaction with the second register device to be initiated.

11. The method of claim 9, wherein identifying the first card credential comprises:

identifying whether any card credentials, from the multiple card credentials, are associated with a valid timestamp; and determining to use the first card credential based on the first card credential being associated with the valid timestamp or based on no card credentials, from the multiple card credentials, being associated with the valid timestamp.

12. The method of claim 9, wherein identifying the first card credential comprises:

determining to use the first card credential based on the incremental counter indicating an index value associated with the first card credential.

13. The method of claim 9, wherein each card credential of the multiple card credentials is used by the card for a single interaction or only for a threshold amount of time from a time indicated by a timestamp associated with the card credential.

14. The method of claim 9, further comprising:

communicating, via the NFC component and with a device, to receive an updated set of card credentials; and storing the updated set of card credentials in one or more memories of the card, wherein the updated set of card credentials replace the multiple card credentials in the one or more memories or are stored in addition to the multiple card credentials in the one or more memories.

15. The method of claim 9, wherein the multiple card credentials are stored in one or more memories of the card in an ordered array, and wherein one or more processors of the card, to identify the first card credential, are configured to:

identifying to use the first card credential based on the first card credential being a next card credential, indicated by the incremental counter, in the ordered array.

16. A non-transitory computer-readable medium storing a set of instructions, the set of instructions comprising:

one or more instructions that, when executed by one or more processors of a card, cause the card to:

use, by the card, multiple card credentials or a permanent card credential based on identifying whether a near field communication (NFC) technique or another communication technique is being used to communicate with a first terminal of a first register device, wherein the multiple card credentials include a primary account number, and wherein the one or more instructions, when using the multiple card credentials or the permanent card credential, further cause the card to:

detect, via an NFC component, that the card is within a communicative proximity of the first terminal; and determine, based on detecting via the NFC component that the card is within the communicative proximity of the first terminal, to use the multiple card credentials;

identify, via an integrated circuit (IC) chip and based on determining to use the multiple card credentials, a first card credential, from the multiple card credentials, to be used for a first interaction with the first register device based on at least one of:

a timestamp associated with the first card credential that indicates an amount of time for which the first card credential is valid, or an incremental counter maintained by the IC chip that indicates a next card credential, from the multiple card credentials, that is to be used; and transmit, via the NFC component, the first card credential to enable the first interaction with the first register device to be initiated.

17. The non-transitory computer-readable medium of claim 16, wherein the one or more instructions, that cause the card to identify the first card credential, cause the card to:

determine to use the first card credential based on the incremental counter indicating an index value associated with the first card credential.

18. The non-transitory computer-readable medium of claim 16, wherein each card credential of the multiple card credentials is used by the card for a single interaction or only for a threshold amount of time from a time indicated by a timestamp associated with the card credential.

19. The non-transitory computer-readable medium of claim 16, wherein the one or more instructions further cause the card to:

communicate, via the NFC component and with a device, to receive an updated set of card credentials; and store the updated set of card credentials in one or more memories of the card, wherein the updated set of card credentials replace the multiple card credentials in the one or more memories or are stored in addition to the multiple card credentials in the one or more memories.

20. The non-transitory computer-readable medium of claim 16, wherein the multiple card credentials are stored in one or more memories of the card in an ordered array, and wherein the one or more processors, to identify the first card credential, are configured to:

identify to use the first card credential based on the first card credential being a next card credential, indicated by the incremental counter, in the ordered array.

* * * * *